United States Patent
Jiang et al.

(10) Patent No.: US 12,480,169 B2
(45) Date of Patent: Nov. 25, 2025

(54) NUCLEIC ACID DETECTION KIT FOR NOVEL CORONAVIRUS 2019-NCOV

(71) Applicant: Daan Gene Co., Ltd., Guangdong (CN)

(72) Inventors: Xiwen Jiang, Guangdong (CN); Jian Fan, Guangdong (CN); Hailong Peng, Guangdong (CN)

(73) Assignee: Daan Gene Co., Ltd., Guangdong (CN)

( * ) Notice: Subject to any disclaimer, the term of this patent is extended or adjusted under 35 U.S.C. 154(b) by 704 days.

(21) Appl. No.: 17/760,195

(22) PCT Filed: Dec. 30, 2020

(86) PCT No.: PCT/CN2020/141569
§ 371 (c)(1),
(2) Date: Aug. 5, 2022

(87) PCT Pub. No.: WO2021/155728
PCT Pub. Date: Aug. 12, 2021

(65) Prior Publication Data
US 2023/0070496 A1 Mar. 9, 2023

(30) Foreign Application Priority Data
Feb. 5, 2020 (CN) .......................... 202010078427.9

(51) Int. Cl.
*C12Q 1/70* (2006.01)
*C12Q 1/686* (2018.01)
*C12Q 1/6876* (2018.01)

(52) U.S. Cl.
CPC ............ *C12Q 1/701* (2013.01); *C12Q 1/686* (2013.01); *C12Q 1/6876* (2013.01); *C12Q 2600/16* (2013.01); *C12Q 2600/166* (2013.01)

(58) Field of Classification Search
CPC ...... C12Q 1/701; C12Q 1/686; C12Q 1/6876; C12Q 2600/16; C12Q 2600/166; C12Q 1/6883; Y02A 50/30
See application file for complete search history.

(56) References Cited

FOREIGN PATENT DOCUMENTS

| CN | 111118228 A | 5/2020 |
|---|---|---|
| CN | 111139317 A | 5/2020 |
| CN | 111733293 A | 10/2020 |

OTHER PUBLICATIONS

International Search Report (with English translation) and Written Opinion issued in PCT/CN2020/141569, dated Mar. 25, 2021, 14 pages provided.
Paraskevis, D. et al., "Full-genome evolutionary analysis of the novel corona virus (2019-nCOV) rejects the hypothesis of emergence as a result of a recent recombination event.", Infection, Genetics and Evolution, vol. 79, Jan. 29, 2020, 4 pages provided, Cited in ISR.
Corman, V. M et al., "Detection of 2019 novel coronavirus (2019-nCOV) by real-time RT-PCR.", Euro Surveill, vol. 25 No. 3, Jan. 23, 2020, 8 pages provided, Cited in ISR.
Lu, R.J. et al., "Genomic characterisation and epidemiology of 2019 novel coronavirus: implications for virus origins and receptor binding.", Lancet, vol. 395, Feb. 22, 2020, pp. 565-574, Clted in ISR.

*Primary Examiner* — Cynthia B Wilder
(74) *Attorney, Agent, or Firm* — HSML P. C.

(57) ABSTRACT

Provided is a nucleic acid detection kit for novel coronavirus 2019-nCOV, and in particular, provided are a kit and a method for multiple detection of the nucleic acid of the novel coronavirus 2019-nCOV. Three nucleic acid targets of the novel coronavirus 2019-nCOV can be detected at the same time. False positives can be prevented by means of mutual authentication among different targets, and detection omissions, which may be caused by mutations, are confirmed, such that the accuracy of virus identification is significantly improved.

8 Claims, 7 Drawing Sheets
Specification includes a Sequence Listing.

NUCLEIC ACID DETECTION KIT FOR NOVEL CORONAVIRUS 2019-NCOV

TECHNICAL FIELD

The present invention belongs to the field of biotechnology and molecular diagnosis. Specifically, the present invention relates to a primer and probe combination and a kit for detecting novel coronavirus 2019-nCoV.

BACKGROUND

Coronaviruses belong to the genus Coronavirus of the family Coronaviridae in the systematic classification. Viruses of the Coronavirus are positive single-stranded RNA viruses with an outer envelope, with a diameter of about 80-120 nm. Its genetic material is the largest of all RNA viruses, infecting humans, mice, pigs, cats, dogs, wolves, chickens, cattle, and avian vertebrates. A variant of coronavirus is the pathogen that causes SARS and is an RNA virus. The diameter of the virus particle is 60-200 nm, with an average diameter of 100 nm, and it is spherical or elliptical and polymorphic. The virus has an envelope, and there are spines on the envelope. The whole virus is like the corona, and the spines of different coronaviruses are obviously different. There are currently seven known coronaviruses that can infect humans: HCoV-229E, HCoV-OC43, HCoV-NL63, HCoV-HKU1, SARS-COV, MERS-COV, and novel coronavirus 2019-nCOV.

Novel coronavirus 2019-nCOV (SARS-COV-2) belongs to the genus β-coronavirus, with an envelope, and the particles are round or elliptical, often polymorphic, with a diameter of 60-140 nm. Its genetic characteristics are significantly different from SARS-COV and MERSr-CoV.

Novel coronavirus 2019-nCoV is a newly discovered virus (the gene sequence refers to GISAID for: BetaCov/Wuhan/WH01/2019|EPI_ISL_406798). At present, the diagnosis of the virus mainly depends on clinical symptoms, virus isolation and culture and detection technology of virus nucleic acid. Clinical symptoms can be preliminarily judged as suspected cases, and the diagnosis of the virus can only be confirmed by a positive nucleic acid test. Cultivation method has high specificity and sensitivity, but the clinical detection time is too long and the process is cumbersome, so it is not suitable for large-scale detection. Real-time fluorescence PCR technology is to add a pair of primers and a specific fluorescent probe to a nucleic acid reaction tube, and both ends of the probe are respectively labeled with a fluorescent reporter group and a fluorescent quenching group. When the probe is intact, the fluorescent signal emitted by the reporter group is absorbed by the quencher group. During PCR amplification, the probe is bound to a single strand of DNA, and the probe is digested and degraded by the exonuclease activity of the 5'-3' end of Taq enzyme, so that the reporter fluorophore and the quencher are separated, and the fluorescence is monitored. The system can receive fluorescent signals, that is, a fluorescent molecule is formed every time a DNA strand is amplified, realizing the complete synchronization of the accumulation of fluorescent signals and the formation of PCR products. Fluorescence PCR technology is a nucleic acid detection technology with higher sensitivity, specificity and precision. The detection results are accurate, highly repeatable, and can reflect the changes of pathogens while avoiding the problem of post-processing required by traditional PCR and reducing the possibility of contamination.

There are currently some nucleic acid detection kits developed based on real-time fluorescence quantitative PCR technology on the market. However, most of them are single-target detection reagents, lack of simultaneous detection of multiple genes to confirm the virus, and the performance of the reagents varies greatly, which is not conducive to the detection and diagnosis of the virus. Based on this, it is very necessary to develop a set of products with high sensitivity, strong specificity and good repeatability for the detection of novel coronavirus 2019-nCOV nucleic acid.

SUMMARY OF THE INVENTION

The purpose of the present invention is to provide a nucleic acid detection kit for Novel Coronavirus 2019-nCOV, so that patients infected with Novel Coronavirus 2019-nCOV can be detected with high efficiency, high specificity and low cost.

In the first aspect of the present invention, it provides a primer pair set for multiplex detection of Novel Coronavirus 2019-nCOV nucleic acid comprising:
  a first primer pair group, wherein the first primer pair group comprises:
  a forward primer as shown in SEQ ID NO: 1; and a reverse primer as shown in SEQ ID NO: 2.

In another preferred embodiment, the primer pair set further includes:
  a second primer pair group, wherein the second primer pair group comprises:
  a forward primer as shown in SEQ ID NO: 4; and a reverse primer as shown in SEQ ID NO: 5.

In another preferred embodiment, the primer pair set further includes:
  a third primer pair group, wherein the third primer pair group comprises:
  a forward primer as shown in SEQ ID NO: 7; and a reverse primer as shown in SEQ ID NO: 8.

In another preferred embodiment, the primer pair set further includes:
  an internal standard primer pair group, wherein the internal standard primer pair group comprises:
  a forward primer as shown in SEQ ID NO: 10; and a reverse primer as shown in SEQ ID NO: 11.

In the second aspect of the present invention, it provides a probe set for multiplex detection of Novel Coronavirus 2019-nCOV nucleic acid, which includes a first probe whose nucleotide sequence is shown in SEQ ID NO: 3.

In another preferred embodiment, the probe set further includes a second probe whose nucleotide sequence is shown in SEQ ID NO: 6.

In another preferred embodiment, the probe set further includes a third probe whose nucleotide sequence is shown in SEQ ID NO: 9.

In another preferred embodiment, the probe set further includes an internal control probe whose nucleotide sequence is shown in SEQ ID NO: 12.

In another preferred embodiment, the 5' end of each probe is labeled with a fluorescent reporter group; and/or, the 3' end of each probe is labeled with a fluorescence quenching group.

In another preferred embodiment, the fluorescent reporter groups labeled on the probes are different from each other.

In the third aspect of the present invention, it provides a kit for multiplex detection of Novel Coronavirus 2019-nCOV nucleic acid, which comprises the primer pair set according to the first aspect of the present invention.

In another preferred embodiment, the kit further comprises the probe set according to the second aspect of the present invention.

In another preferred embodiment, the kit comprises a first container, and the first container contains a primer and probe mix (primer-probe mixture), and the primer and probe mix contains polynucleotides having sequences shown in SEQ ID NOS: 1 to 9.

In another preferred embodiment, the kit comprises a first container, and the first container contains a primer and probe mix, and the primer and probe mix further contains polynucleotides having sequences shown in SEQ ID NOS: 10 to 12.

In another preferred embodiment, the primer and probe mix is prepared using a buffer for PCR (Buffer).

In another preferred embodiment, the kit further comprises a second container, and the second container contains a PCR enzyme system including a hot-start enzyme and a reverse transcriptase M-MMLV; preferably further includes RNase inhibitor.

In another preferred embodiment, the kit further includes a third container, and the third container contains a positive control.

In another preferred embodiment, the kit further includes a fourth container, and the fourth container contains a negative control.

In the fourth aspect of the present invention, it provides a method for multiplex detection of Novel Coronavirus 2019-nCOV nucleic acid comprising the following steps:
(1) providing a nucleic acid sample of a subject to be tested;
(2) preparing a PCR reaction system for the PCR detection:
wherein the PCR reaction system includes: the nucleic acid sample provided in step (1), the primer pair set according to the first aspect of the present invention, and the probe set according to the second aspect of the present invention.

In another preferred embodiment, the nucleic acid sample may be from a throat swab sample, an alveolar lavage fluid sample, a blood sample, or an environmental sample.

In another preferred embodiment, the method is a detection method for non-diagnostic purposes.

In another preferred embodiment, the PCR reaction system further includes a positive control, and/or a negative control.

In another preferred embodiment, the PCR reaction system further includes a PCR enzyme system.

In a fifth aspect of the present invention, it provides a use of the primer pair set according to the first aspect of the present invention, and/or the probe set according to the second aspect of the present invention for preparing a PCR detection kit, the PCR detection kit is used to detect Novel Coronavirus 2019-nCOV nucleic acid.

It should be understood that, within the scope of the present invention, the technical features specifically described above and below (such as the examples) can be combined with each other, thereby constituting a new or preferred technical solution which needs not be described one by one.

DETAILED DESCRIPTION OF INVENTION

Figure 1:
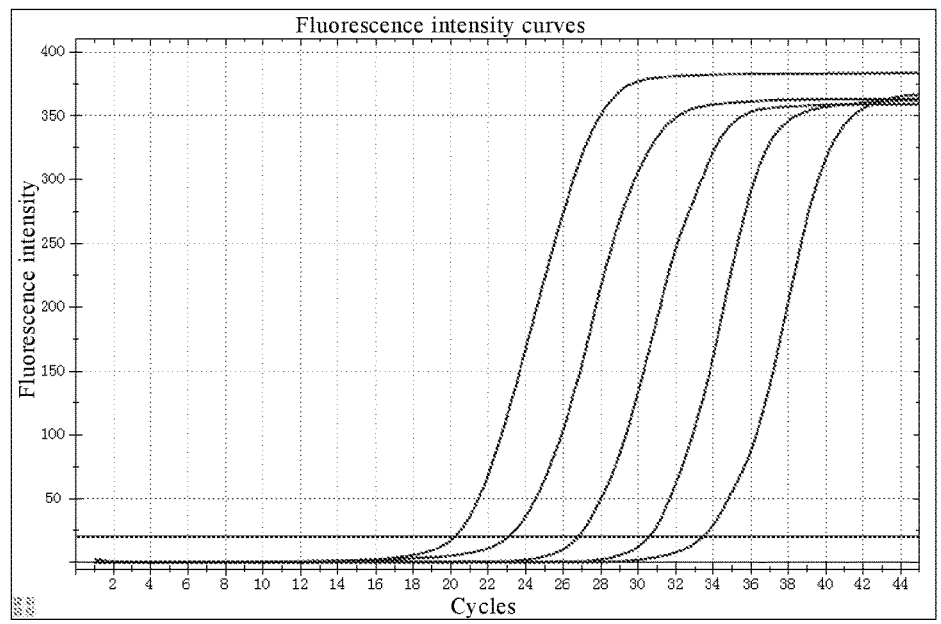
FIG. 1: Detection limit for N gene.

Through extensive and intensive research, the present inventor has obtained a kit and method for multiplex detection of the novel coronavirus 2019-nCOV nucleic acid, which can simultaneously detect the three nucleic acid targets of novel coronavirus 2019-nCOV and mutual verification between different targets can be used to prevent false positives and to confirm missed detections that may be caused by mutations, which significantly improves the accuracy of virus identification.

Before describing the present invention, it should be understood that the present invention is not limited to the specific methods and experimental conditions as described, due to such methods and conditions may vary. It should also be understood that the terminology used herein is for the purpose of describing specific embodiments only and is not intended to be limiting, and the scope of the present invention will be limited only by the appended claims.

Unless otherwise defined, all technical and scientific terms used herein have the same meaning as commonly understood by those of ordinary skill in the art to which this invention belongs. As used herein, when used in reference to specifically recited values, the term "about" means that the value may vary from the recited value by no more than 1%. For example, as used herein, the expression "about 100" includes all values between 99 and 101 and (e.g., 99.1, 99.2, 99.3, 99.4, etc.).

Although any methods and materials similar or equivalent to those described in the present invention can be used in the practice or testing of the present invention, the preferred methods and materials are exemplified herein.

Multiplex PCR

Multiplex PCR, also known as multiple primers PCR or complex PCR, is a PCR reaction in which two or more pairs of primers are added to the same PCR reaction system to simultaneously amplify multiple nucleic acid fragments. The reaction principle, reaction reagents and operation process are the same as general PCR.

There are many factors that affect multiplex PCR reactions, such as:
(1) The imbalance of the reaction system. The imbalance of the reaction system leads to the rapid amplification of certain dominant primers and their templates in the previous rounds of reactions, and a large number of amplification products are obtained, and these amplification products are also good inhibitors of DNA polymerase. Therefore, as a large number of amplification products appear, the polymerization ability of the polymerase is more and more strongly inhibited. Therefore, the primers and their templates that are at a disadvantage in the early stage are more difficult to react, resulting in a very small amount of amplification product that cannot be detected.

(2) Primer specificity. If the primer has stronger binding ability with other non-target gene fragments in the system, the ability of the target gene to bind to the primer will be contested, resulting in a decrease in amplification efficiency.

(3) The optimal annealing temperature is inconsistent. Multiple pairs of primers are put into one system for amplification. Since the annealing temperature for PCR reaction is the same, the optimal annealing temperature of each pair of primers is required to be close.

(4) Primer dimers, including the dimers between primers and the hairpin structure formed by the primers themselves, and there is also a third-party DNA-mediated polymer. Like non-specific primers, these dimers will interfere with the competition between the primer and the target binding site, affecting the amplification efficiency.

Although several factors affecting the efficiency of amplification are mentioned as above, more factors are unclear. So far, there is no effective method that can clearly predict the amplification efficiency.

The present invention provides an oligonucleotide sequence combination for specifically detecting the N, ORF1ab and E gene of novel coronavirus 2019-nCOV in a sample and a kit containing the oligonucleotide sequence combination, wherein the primer sequences for the N gene amplification are:

SEQ ID NO. 1: AAGAAATTCAACTCCAGGCAGC and

SEQ ID NO. 2: GCTGGTTCAATCTGTCAAGCAG, the corresponding detection probe sequence is SEQ ID NO: 3:

TCACCGCCATTGCCAGCCA;

the primer sequences for the ORF1ab gene amplification are:

SEQ ID NO. 4: TTATCACCCGCGAAGAAG and

SEQ ID NO. 5: TCTAGTAGCATGACACCCCT, the corresponding detection probe sequence is SEQ ID NO: 6:

TAAGACATGTACGTGCATGGATTGGC;

the primer sequences for the E gene amplification are:

SEQ ID NO. 7: CTTTCGTGGTATTCTTGCTAGTT and

SEQ ID NO. 8: CACGTTAACAATATTGCAGCA, the corresponding detection probe sequence is SEQ ID NO: 9:

TAGCCATCCTTACTGCGCTTCGATTG.

The probe labels of each gene of the present invention are not limited to the single labels listed at the same wavelength, and include multiplex detection reagents in different combinations of different labels.

In one embodiment, the kit further includes internal standard quality control and amplification primers and detection probes;

the internal standard quality control contains the target gene fragment whose sequence is shown in SEQ ID NO: 13;

the sequences of the internal standard quality control amplification primers are respectively SEQ ID NO: 10: CTAACACTGGCTCGTGTG and SEQ ID NO: 11: TGGGATGGGGAGTCTGT, the corresponding detection probe sequence is SEQ ID NO: 12:

AGGCTGGTGTAAAGCGGCCTT.

The target gene fragment sequence shown in SEQ ID NO: 13 is as follows:

CTAACACTGGCTCGTGTGACAAGGCCATGAGGCTGGTGTAAAGCGG

CCTTGGAGTGTGTATTAAGTAGGCGCACAGTAGGTCTGAACAGACT

CCCCATCCCA.

Selecting the target gene fragment as the internal standard can monitor the sample collection and the sample extraction process to prevent false negatives due to the failure of sample nucleic acid extraction.

In one embodiment, the kit comprises MS2 pseudovirus containing N/ORF1ab/E gene fragment as a positive control and sterile saline as a negative control.

For the gene sequence of novel coronavirus 2019-nCOV in the present invention, please refers to GISAID: BetaCov/Wuhan/WH01/2019|EPI_ISL_406798; for the oligonucleotide sequence information of its N, ORF1ab and E genes, please refer to the ReferenceRoujian Lu, Xiang Zhao, Juan Li, et. al, Genomic characterisation and epidemiology of 2019 novel coronavirus: implications for virus origins and receptor binding. Lancet. 2020 Jan. 30.

In one embodiment, the kit includes PCR reaction solution containing primers and probes targeting N/ORF1ab/E gene and internal standard, dNTPs, PCR buffer and PCR enzyme system containing hot-start Hot.Taq enzyme, reverse transcriptase M-MMLV and RNA enzyme inhibitor, in which the concentration of primers and probes are 0.1-1 µM, the concentration of dNTPs is 0.2-0.4 mM, the concentration of $MgCl_2$ is 2-5 mM, and the concentration of hot-start Hot.taq is 2.5-10U, the concentration of reverse transcriptase M-MMLV is 40-100U and the concentration of RNAenzyme inhibitors is 8-20U.

A method for using the novel coronavirus 2019-nCOV nucleic acid detection kit, includes the following steps: extracting a sample to be tested (extraction reagent using nucleic acid extraction or purification reagent produced by Daan Gene Co., Ltd. of Sun Yat-sen University (Yuehuixiebei No. 20150348)) to obtain nucleic acid samples (positive control and negative control participate in the extraction at the same time); taking 5 µL into the above PCR reaction solution (17 µL) and enzyme mixture (3 µL), and the amplification reaction was carried out in a real-time fluorescent PCR instrument, and the fluorescence channels were selected in turn by FAM, VIC/HEX, Texas red, and Cy5. The PCR amplification procedure is as follows;

50° C., 15 min, 95° C., 15 min; 1 cycle;

94° C., 15 sec, 55° C., 45 sec (collecting fluorescence); 45 cycles.

After PCR is completed, different fluorescent channel curves and Ct values are used to determine the negative or positive of the corresponding pathogen DNA. The test results can be used for the auxiliary diagnosis of novel coronavirus 2019-nCoV infection, providing a reliable basis for virus identification and prevention and control.

The composition of the kit is detailed in Table 1 and Table 2. It can detect three target genes of novel coronavirus 2019-nCOV at the same time, and can verify each other through different targets to prevent false positives and to confirm the missed detection that may be caused by mutation, which can significantly improve the accuracy of virus identification.

TABLE 1

Kit composition

| Composition | Main component |
| --- | --- |
| PCR reaction solution | Specific primers and fluorescent probes (SEQ ID NOs. 1 to 12), dNTPs, PCR buffer |
| PCR enzyme system | Hot start Hot.Taq enzyme, reverse transcriptase M-MMLV and RNase inhibitors |
| Positive control | MS2 Pseudovirus containing N/ORF1ab/E gene fragment, |
| Negative control | Sterile Saline |

The primer and probe sequences required by the kit are shown in Table 2:

TABLE 2

Primers, probes and sequence numbers

| Primer and probe name | Primer/probe sequence | SEQ ID NO. |
| --- | --- | --- |
| N-F1 | AAGAAATTCAACTCCAGGCAGC | 1 |
| N-R1 | GCTGGTTCAATCTGTCAAGCAG | 2 |
| N-P | 5' FAM- TCACCGCCATTGCCAGCCA- BHQ1 | 3 |
| ORF1ab-F1 | TTATCACCCGCGAAGAAG | 4 |
| ORF1ab-R1 | TCTAGTAGCATGACACCCCT | 5 |
| ORF1ab-P | 5' HEX- ACGTGCATGGATTGGCTTCGATGT BHQ1-3' | 6 |
| E-F1 | CTTTCGTGGTATTCTTGCTAGTT | 7 |
| E-R1 | CACGTTAACAATATTGCAGCA | 8 |
| E-P | 5' Texas red- TAGCCATCCTTACTGCGCTTCGATTG -BHQ2-3' | 9 |
| Internal standard-F1 | CTAACACTGGCTCGTGTG | 10 |
| Internal standard-R1 | TGGGATGGGGAGTCTGT | 11 |
| Internal standard-P | 5'Cy5- AGGCTGGTGTAAAGCGGCCTT- BHQ2-3' | 12 |

Preferably, the fluorescent group is selected from the group consisting of FAM, HEX, NED, ROX, TET, JOE, TAMRA, CY3, and CY5.

Preferably, the quenching group is selected from the group consisting of MGB, BHQ-1, BHQ-2, and BHQ-3.

In the primer design of the present invention, multiple primer-probe combinations that will not interfere with each other, have high amplification efficiency, and have good specificity are finally screened through a large number of tests, and combined, optimized, and verified.

The criteria used by the kit of the present invention to determine the effectiveness of the detection are:

Negative control and positive control are simultaneously detected in each test. When the test result of the positive control is positive and the test result of the negative control is negative, the test result is valid.

The method for using the kit of the present invention includes the following steps:

(1) Extracting the total nucleic acid in the test sample to obtain a nucleic acid sample.

(2) Mixing the nucleic acid sample with the PCR reaction solution and PCR enzyme system to prepare a PCR reaction system.

(3) Performing Real-time fluorescence PCR reaction, and the procedure is as follows:

the first stage: 50° C. 2-15 min, 95° C. 10-15 min, 1 cycle; the second stage: 94° C. 10-15 s, 55-60° C. 45 s, 45 cycles.

After PCR, different fluorescence channel curves and Ct values were used to judge the negative and positive of the corresponding pathogen nucleic acid, and the detection result was given.

The Beneficial Effects of the Present Invention Include:

Most of the current detection reagents are single-target detection reagents. RNA virus mutates rapidly, and it is easy to miss detection of mutant viruses, which is not conducive to the timely detection and prevention of viruses. The three targets of novel coronavirus 2019-nCOV are tested at the same time in the invention, so they can be mutually verified between different targets to prevent false positives, confirm the miss detection that may be caused by mutation, and significantly improve the accuracy of virus identification. At the same time, the system contains an endogenous internal standard quality control system, which can monitor the entire process of sampling, sample storage, nucleic acid extraction and PCR amplification to prevent the occurrence of false negatives.

The present invention is suitable for the detection of novel coronavirus 2019-nCOV nucleic acid, and can provide a reliable basis for virus identification and prevention and control, and is worthy of popularization and application. In addition, the method of the present invention is also suitable for non-diagnostic purposes. For example, in the epidemic prevention and control process, the detection method of the present invention can be used to detect viral nucleic acids in the environment, and these viral nucleic acid information can be used for public health management.

The present invention will be further described in detail below in conjunction with specific embodiments. It should be understood that these examples are only used to illustrate the present invention and not to limit the scope of the present invention. The experimental methods without detailed conditions in the following examples are generally in accordance with the conditions described in the conventional conditions such as Sambrook. J et al. "Guide to Molecular Cloning Laboratory" (translation by Huang Peitang et al., Beijing: Science Press, 2002), Or as recommended by the manufacturer. Unless otherwise stated, percentages and parts are calculated by weight. Unless otherwise specified, the experimental materials and reagents used in the following examples can be obtained from commercially available channels.

Example 1 Detection Limit Test of Novel Coronavirus 2019-ncCov Nucleic Acid Detection Kit The quantified pseudoviruses were used as the initial samples and were diluted to a concentration of 105 copies/ml, and then sequentially diluted to 104, 103, 500, 250 copies/ml. And the pseudoviruses containing the internal standard amplified fragments were added into each sample to a final concentration of 104 copies/ml as the samples to be tested to test the sensitivity of the triple detection reagent. The PCR reaction system includes the primer and probe combinations shown in SEQ ID NOS: 1 to 12 of the present invention.

Figure 2:
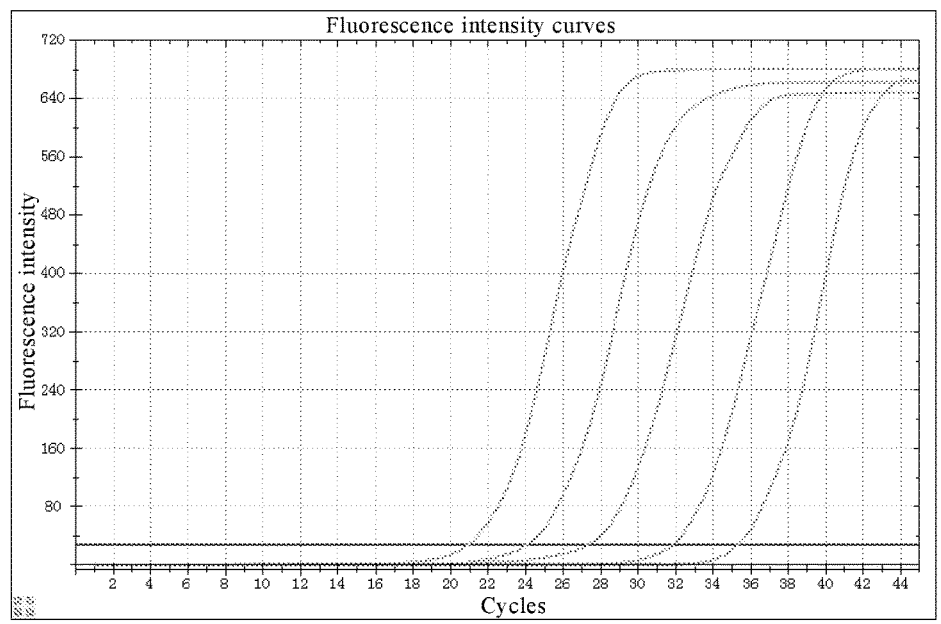
FIG. 2: Detection limit test for ORF1ab gene.
Figure 3:
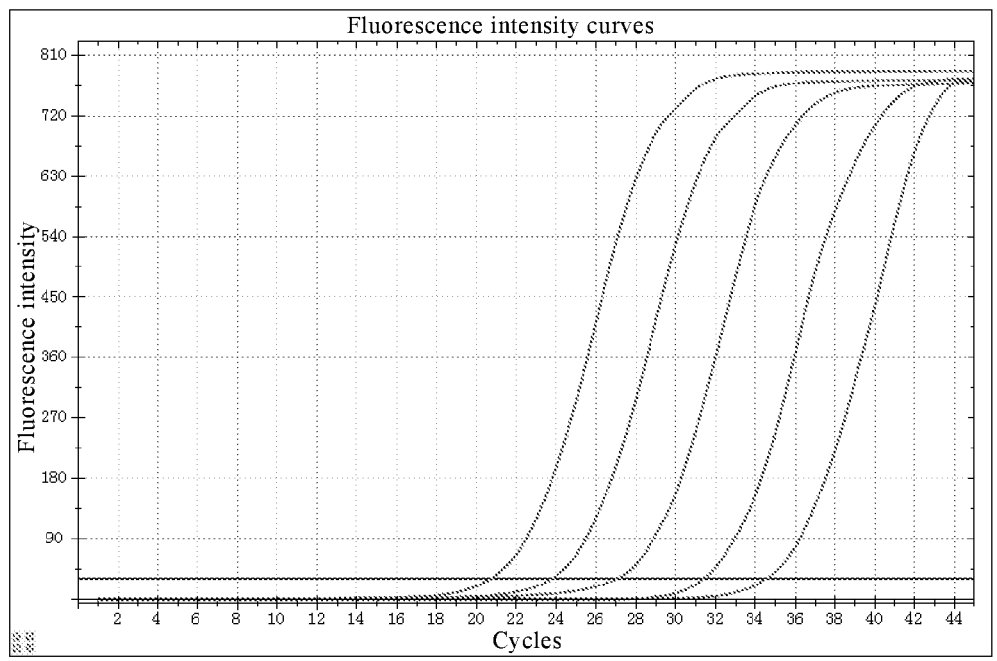
FIG. 3: Detection limit test for E gene.
Figure 4:
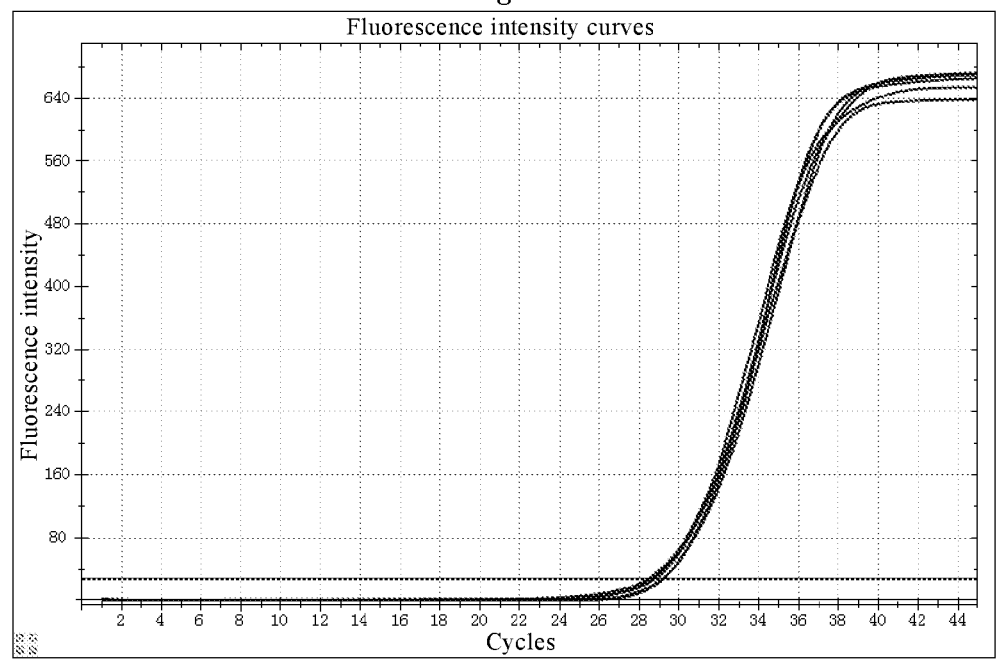
FIG. 4: Internal standard test results.

Refer to FIGS. 1 to 4 for test results:
FIG. 1: Detection limit for N gene;
FIG. 2: Detection limit test for ORF1ab gene;
FIG. 3: Detection limit test for E gene;
FIG. 4: Internal standard test results;

The test results showed that the lowest concentration that can be detected for the positive control at different concentrations was 500 copies/ml.

Example 2 Specificity Test of Novel Coronavirus 2019-nCOV Nucleic Acid Detection Kit Other pathogens that are similar to Novel Coronavirus 2019-nCOV species or cause similar symptoms (such as Seasonal influenza A H1N1 virus, Novel Influenza A H1N1 (2009) virus, Influenza A H3N2, H5N1, H7N9, Influenza B Yamagata, Influenza B Victoria, Respiratory syncytial virus type A, Respiratory syncytial virus type B, Parainfluenza virus, Adenovirus, Enterovirus, Human interstitial lung Viruses (human metapneumovirus), Epstein-Barr virus, Measles virus, Human cytomegalovirus, Rotavirus, Norovirus, Mumps virus, Varicella-zoster virus, *Mycoplasma pneumoniae, Chlamydia pneumoniae, Legionella, Bacillus* pertussis, *Haemophilus influenzae, Staphylococcus aureus, Streptococcus pneumoniae, Streptococcus pyogenes, Klebsiella pneumoniae, Mycobacterium tuberculosis, Aspergillus fumigatus, Candida albicans, Candida glabrata, Cryptococcus neoformans*, Coronavirus (HKU1, OC43, NL63, 229E) and human genomic DNA were used as specificity references to test the specificity of the novel coronavirus 2019-nCOV nucleic acid detection kit.

Figure 5:
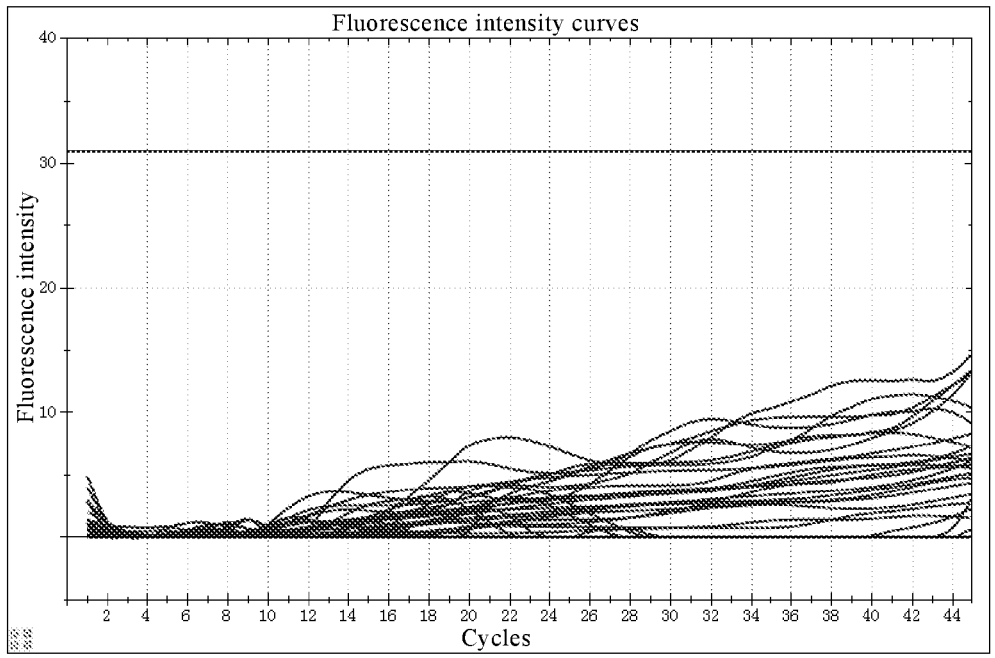
FIG. 5: Specific test results.
Figure 6:
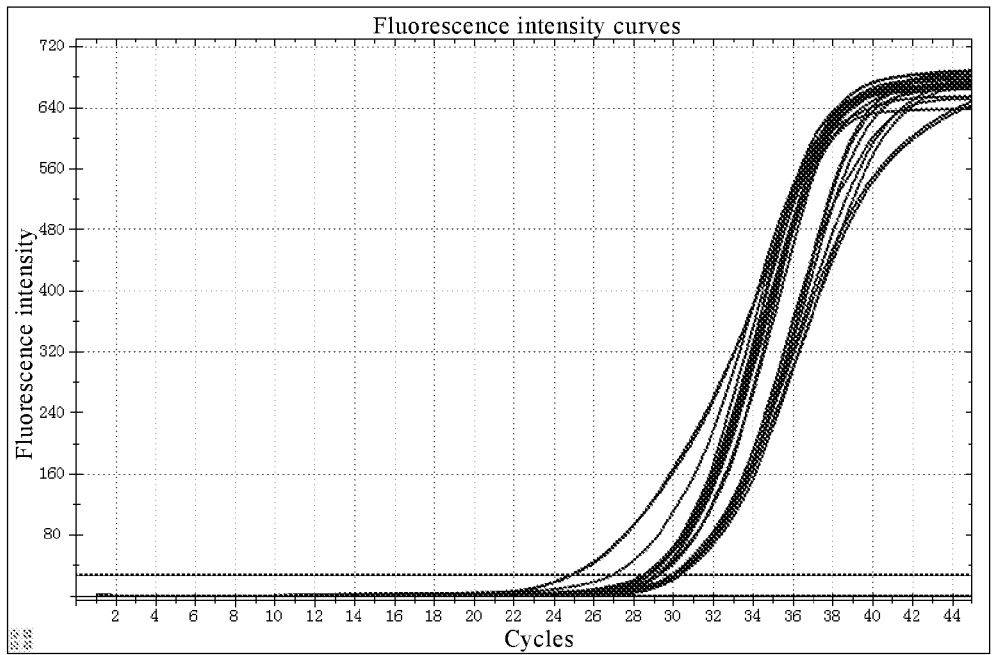
FIG. 6: Specific test results for internal standard.

Refer to FIGS. 5 to 6 for test results:
FIG. 5: Specific test results;
FIG. 6: Specific test results for internal standard;

The specificity references were tested and the test results were all negative, and the test results of the internal standard quality control were all positive. It was shown that the kit of the present invention has excellent specificity.

Example 3: Precision Test of Novel Coronavirus 2019-nCOV Nucleic Acid Detection Kit Pseudovirus containing N/ORF1ab/E gene was diluted into 105 and 103 copies/ml as precision references. Test was repeated 10 times to calculate the variable coefficient of each concentration of precision reference.

Figure 7:
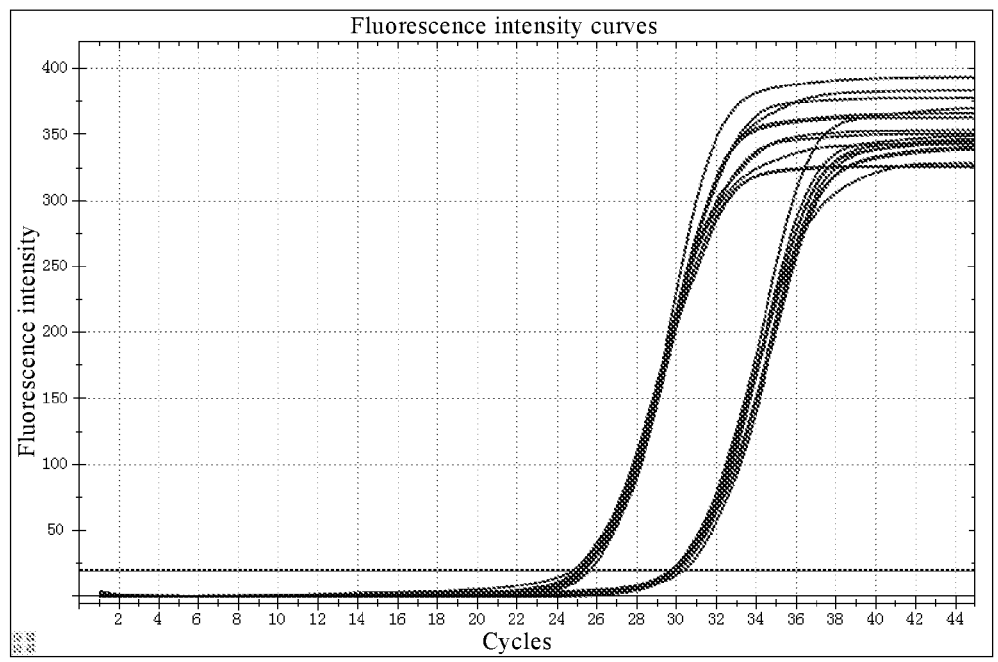
FIG. 7: Precision detection results for N gene.
Figure 8:
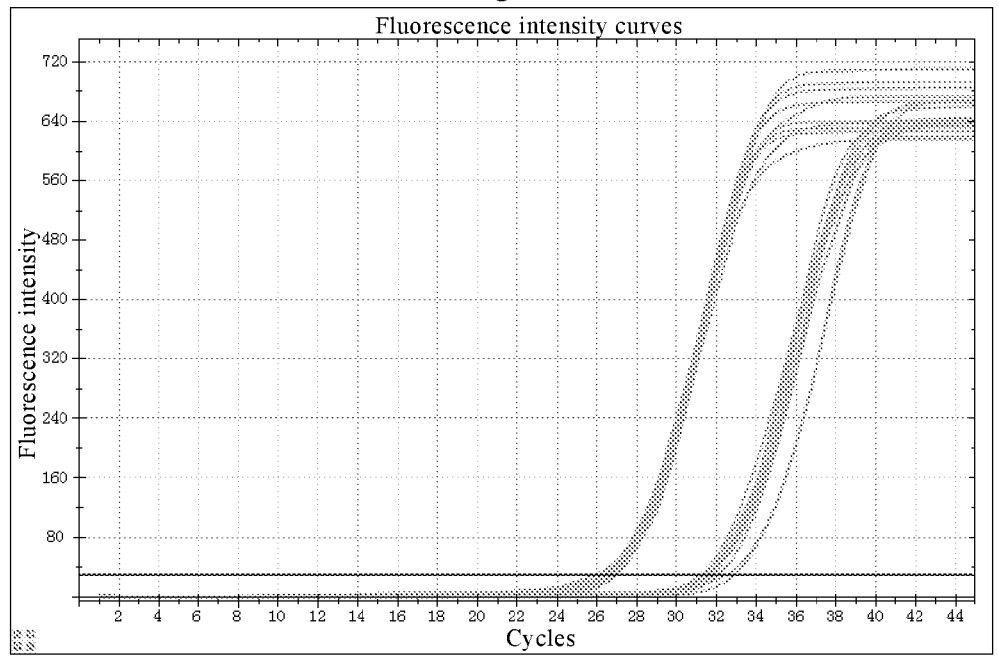
FIG. 8: Precision detection results for ORF1ab gene.
Figure 9:
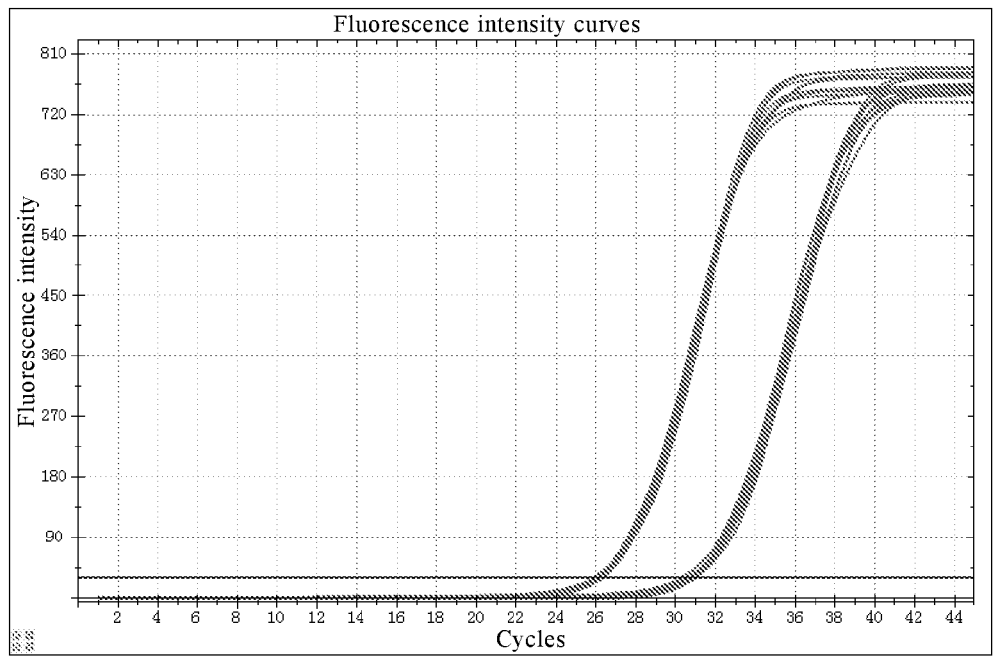
FIG. 9: Precision detection results for E gene.

Refer to FIGS. 7 to 9 for test results:
FIG. 7: Precision detection results for N gene;
FIG. 8: Precision detection results for ORF1ab gene;
FIG. 9: Precision detection results for E gene;

After testing, the variable coefficient of the precision reference with high concentration and low concentration of novel coronavirus 2019-nCOV were 1.16% and 1.54% for the N gene, 1.16% and 1.54% for the ORF1ab gene, and 1.16% and 1.54% for the E gene. The variable coefficients of the precision reference with different concentrations of the three gene were all less than 5%.

Example 4. Interfering Substance Test of Novel Coronavirus 2019-nCOV Nucleic Acid Detection Kit Respiratory pathogen therapeutic agents such as phenylephrine, oxymetazoline, sodium chloride, beclomethasone, dexamethasone, flunisolide, triamcinolone acetonide, budesonide, mometasone, fluticasone, histamine hydrochloride, interferon, zanamivir, ribavirin, oseltamivir, peramivir, lopinavir, mupirocin, levofloxacin, azithromycin, tobramycin, ritonavir, meropenem, ceftriaxone, ritonavir, tobramycin, meropenem and arbidol were separately added into 103 copies/ml of pseudovirus cultures as interfering substance in the test, and samples without interfering substances were used as controls to test the effect of interfering substances on the amplification of primer and probes.

Figure 10:
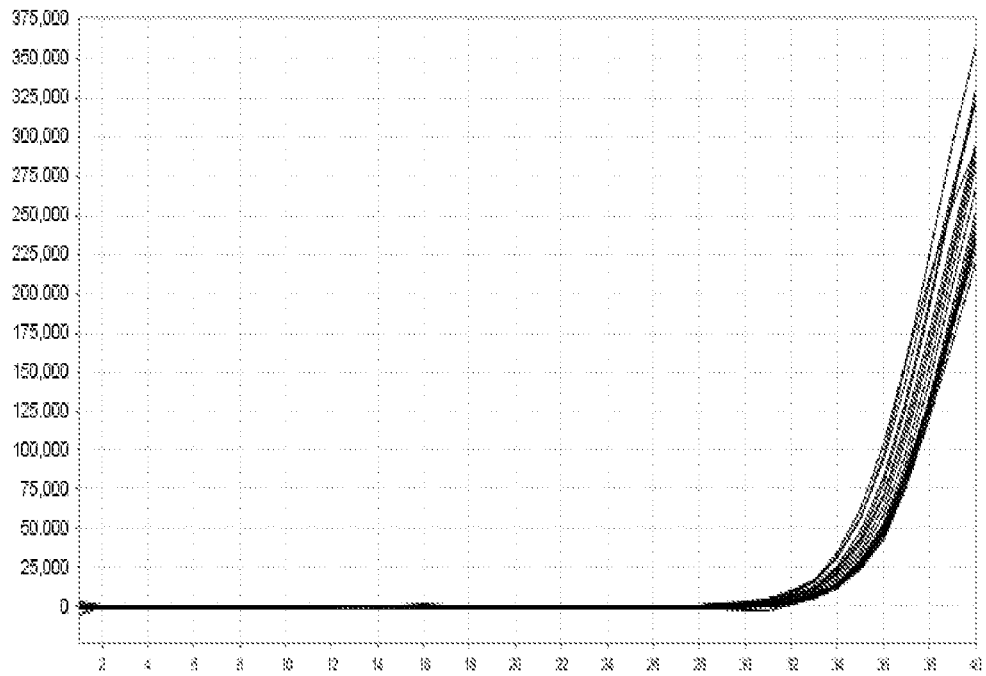
FIG. 10: Interference detection results for N gene.
Figure 11:
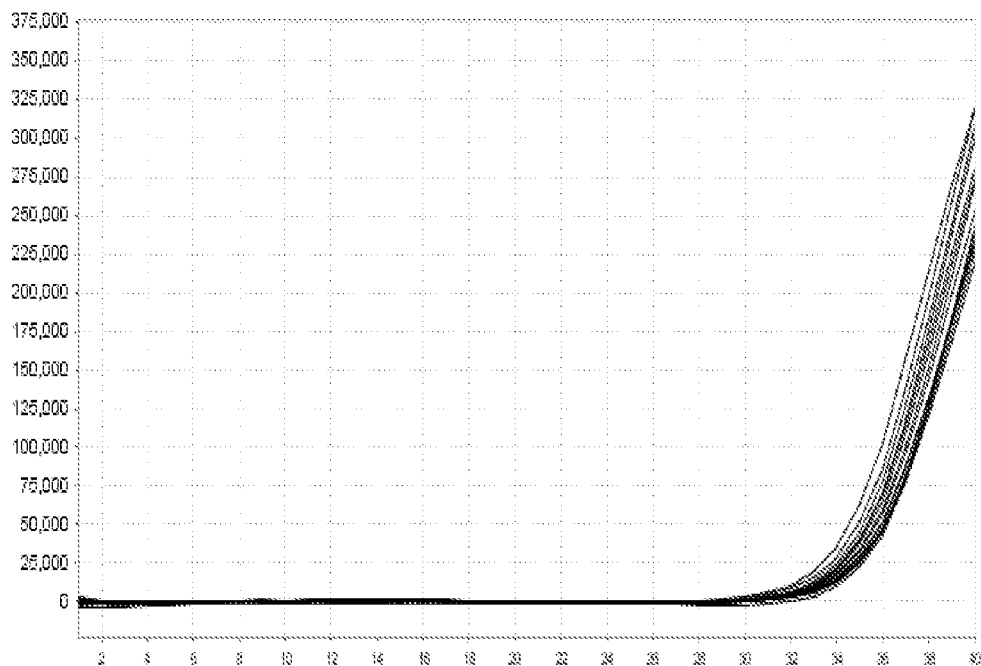
FIG. 11: Interference detection results for ORF1ab gene.
Figure 12:
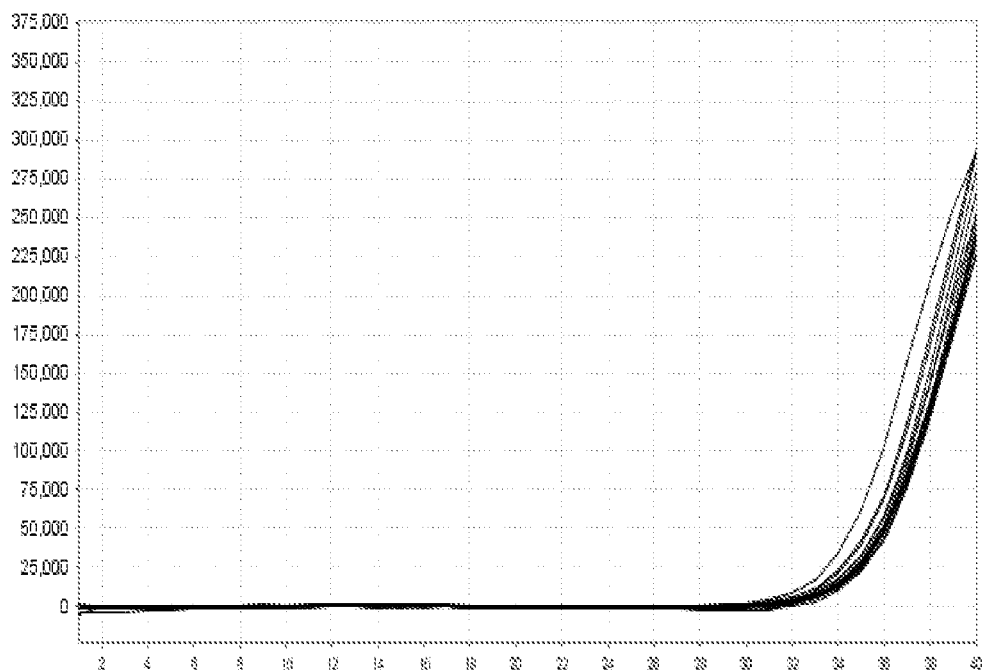
FIG. 12: Interference detection results for E gene.
Figure 13:
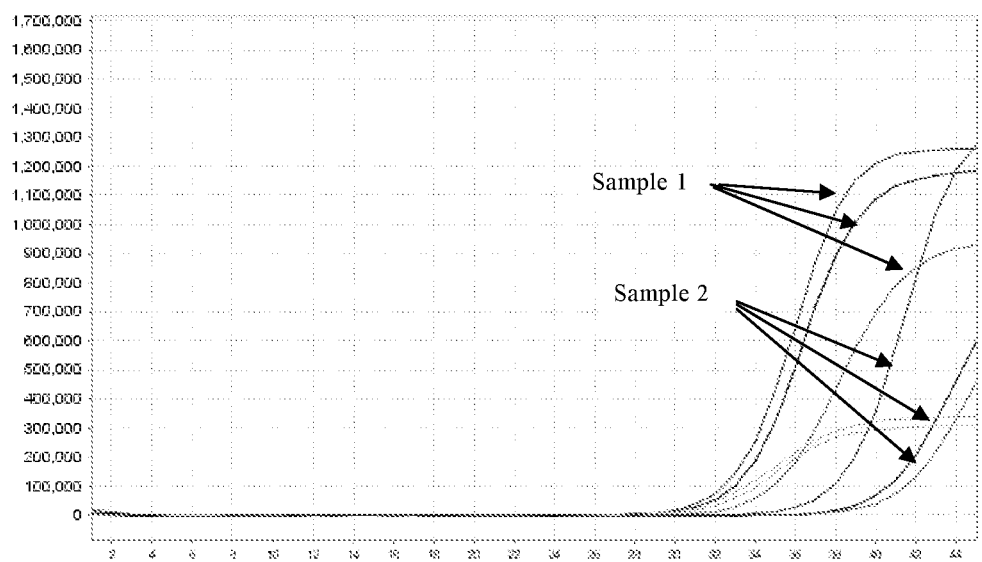
FIG. 13: Detection results of clinical samples.

Refer to FIGS. 10-15 for test results:
FIG. 10: Interference detection results for N gene;
FIG. 11: Interference detection results for ORF1ab gene;
FIG. 12. Interference detection results for E gene;

Phenylephrine, oxymetazoline, chlorine sodium chloride, beclomethasone, dexamethasone, flunisolide, triamcinolone acetonide, budesonide, mometasone, fluticasone, histamine hydrochloride, interferon, zanamivir, ribavirin, oseltamivir, peramivir, lopinavir, mupirocin, levofloxacin, azithromycin, tobramycin, ritonavir, meropenem, ceftriaxone, ritonavir, tobramycin, meropenem and arbidol were added to the sample to be tested. The results showed that there was no obvious interference to the test results, and the interpretation of the results were not affected.

Example 5. Clinical Samples Testing

Extraction of nucleic acid from test samples:
(1) Extraction of Nucleic Acid Template of Clinical Samples Collect clinical samples of throat swabs from 22 suspected patients, and the nucleic acid samples were obtained using the nucleic acid extraction or purification reagent (Yuehuixiebei No. 20150348) from Daan Gene Co., Ltd. of Sun Yat-sen University (the positive control and the negative control were involved in the extraction simultaneously). 5 μL of nucleic acid samples was added to the above PCR reaction solution (17 μL) and the enzyme mixture (3 μL), and the amplification reaction was performed in the real-time fluorescent PCR instrument, and the fluorescent channels were selected in order of FAM, VIC/HEX, Texas red and Cy5. The PCR amplification procedure was as follows:
50° C., 15 min, 95° C., 15 min; 1 cycle
94° C., 15 sec, 55° C., 45 sec (collecting fluorescence); 45 cycles.

After the PCR was completed, the negative and positive of the corresponding pathogen DNA were determined by different fluorescence channel curves and Ct values.

In the tested 22 suspected clinical samples, a total of 17 novel coronavirus 2019-nCOV nucleic acid positive clinical samples were detected. Typical test results were shown in FIG. 13.

Sequencing verification results showed that the detection accuracy of the detection system of the present invention reached 100%, which further proved the accuracy of clinical detection of the system of the present invention.

Comparative Example 1

In the research process, the present inventor screened dozens of PCR primers and probes for the novel coronavirus 2019-nCOV target nucleic acid sequence. After extensive testing, a combination of primers and probes with sensitivity and specificity that can meet the needs of clinical testing and can perform multiple tests was finally obtained.

For the detection target of the N, ORF1ab and E gene of novel coronavirus 2019-nCOV, the present inventor had undergone a lot of screening and combination. For example, for the ORF1ab gene, some typical primer sequences designed were as follows:

```
ORF1ab gene control upstream primer ORF1ab-F2:
                                     (SEQ ID NO. 14)
ATCAAGTTAATGGTTACCCTAACATG ORF1ab gene control downstream primer ORF1ab-R2:
                                     (SEQ ID NO. 15)
CAACAGCTTCTCTAGTAGCATGACA ORF1ab gene control upstream primer ORF1ab-F3:
                                     (SEQ ID NO. 16)
TGGGTTTTAAAATGAATTATCAAGTT ORF1ab gene control downstream primer ORF1ab-R3:
                                     (SEQ ID NO. 17)
AACCTAGCTGTAAAGGTAAATTGG
```

The specific detection steps, detection conditions, and probe sequences were same as the above embodiments, and PCR detection tests are performed.

Figure 14:
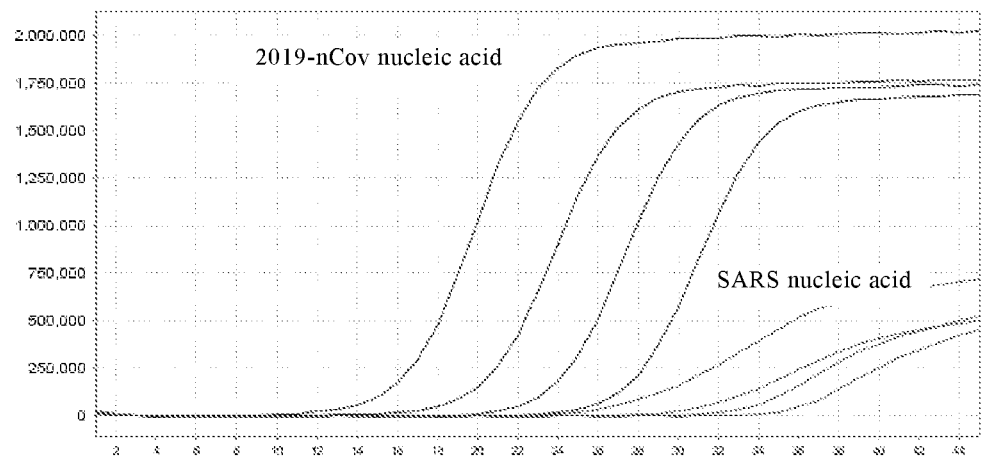
FIG. 14: Detection results for ORF1ab gene using control primer pair.
Figure 15:
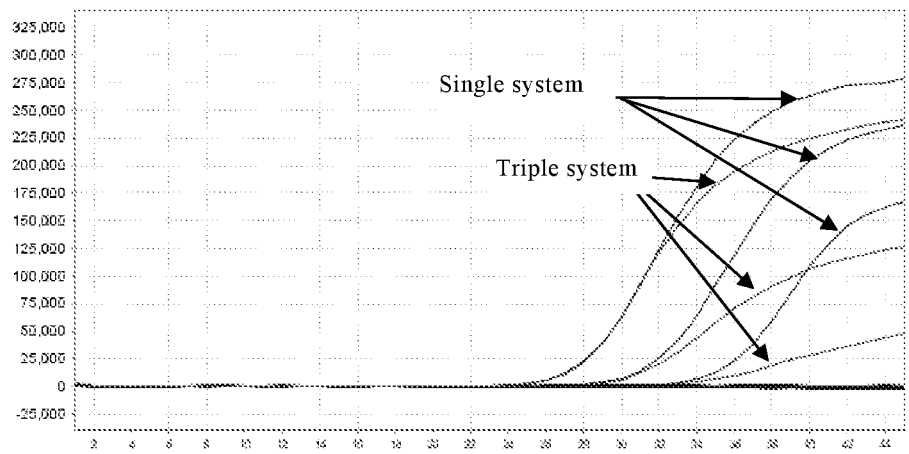
FIG. 15: Detection results for ORF1ab gene using control primer pair.

The detection results using ORF1ab-F2 and ORF1ab-R2 were shown in FIG. 14, and the detection results indicate that the primer pair had poor specificity. The detection results using ORF1ab-F3 and ORF1ab-R3 indicated that the primer pair had better specificity and sensitivity to the ORF1ab gene target nucleic acid in a single detection system. However, in the multiplex detection system, the amplification of low concentration nucleic acid of ORF1ab gene was significantly inhibited. The results of single and multiplex systems tests were shown in FIG. 15. This indicated that the control primer pairs ORF1ab-F3 and ORF1ab-R3 cannot be used in multiplex detection systems.

All literatures mentioned in the present application are incorporated herein by reference, as though each one is individually incorporated by reference. In addition, it should also be understood that, after reading the above teachings of the present invention, those skilled in the art can make various changes or modifications, equivalents of which falls in the scope of claims as defined in the appended claims.

What is claimed:

1. A kit for multiplex detection of novel coronavirus 2019-nCOV nucleic acid, which comprises a primer pair set and a probe set,
wherein the primer pair set comprises:
a first primer pair group comprising:
a forward primer as shown in SEQ ID NO: 1; and a reverse primer as shown in SEQ ID NO: 2;
a second primer pair group comprising:
a forward primer as shown in SEQ ID NO: 4 and a reverse primer as shown in SEQ ID NO: 5;
a third primer pair group comprising:
a forward primer as shown in SEQ ID NO: 7 and a reverse primer as shown in SEQ ID NO: 8; and
an internal standard primer pair group comprising:
a forward primer as shown in SEQ ID NO: 10 and a reverse primer as shown in SEQ ID NO: 11; and
the probe set comprises:
a first probe whose nucleotide sequence is shown in SEQ ID NO: 3, the 5' end of the first probe is labeled with a first fluorescent reporter group, and the 3' end of the first probe is labeled with a first fluorescence quenching group;
a second probe whose nucleotide sequence is shown in SEQ ID NO: 6, the 5' end of the second probe is labeled with a second fluorescent reporter group, and the 3' end of the second probe is labeled with a second fluorescence quenching group;
a third probe whose nucleotide sequence is shown in SEQ ID NO: 9, the 5' end of the third probe is labeled with a third fluorescent reporter group, and the 3' end of the third probe is labeled with a third fluorescence quenching group; and
an internal control probe whose nucleotide sequence is shown in SEQ ID NO: 12, the 5' end of the internal control probe is labeled with a fourth fluorescent reporter group, and the 3' end of the internal control probe is labeled with a fourth fluorescence quenching group,
wherein fluorescence channels of the first to the fourth fluorescent reporter groups are different from each other.

2. The kit of claim 1, wherein the kit comprises a first container, wherein the first container contains a primer and probe mix, and the primer and probe mix comprises polynucleotides having sequences shown in SEQ ID NOS: 1 to 9.

3. The kit of claim 2, wherein the primer and probe mix further contains polynucleotides having sequences shown in SEQ ID NOS: 10 to 12.

4. The kit of claim 2, wherein the kit further includes a second container, and the second container contains a PCR enzyme system including a hot-start enzyme and a reverse transcriptase M-MMLV.

5. The kit of claim 4, wherein the kit further includes a third container, and the third container contains a positive control.

6. The kit of claim 5, wherein the kit further includes a fourth container, and the fourth container contains a negative control.

7. A method for multiplex detection of a novel coronavirus 2019-nCOV nucleic acid, with the kit according to claim 1, comprising:
(1) providing a nucleic acid sample of a subject to be tested;
(2) preparing a PCR reaction system:
wherein the PCR reaction system includes: the nucleic acid sample provided in (1), a primer and probe mix and a PCR enzyme system including a hot-start enzyme and a reverse transcriptase M-MMLV, wherein the primer and probe mix contains polynucleotides having sequences shown in SEQ ID NOS: 1 to 9;
(3) performing a real-time fluorescence PCR reaction and obtaining an amplification curve and a Ct value from each of the first probe, the second probe, the third probe, and the fourth probe, which are detected by the fluorescence from the first fluorescent reporter group, the second fluorescent reporter group, the third fluorescent reporter group, and the fourth reporter group, respectively,
wherein the PCR reaction comprises:
a first stage of holding at 50° C. for 2-15 min followed by holding at 95° C. for 10-15 min for 1 cycle;
a second stage of holding at 94° C. for 10-15 s followed by holding at 5-60° C. for 45 s, for 45 cycles;
(4) determining whether the subject is negative or positive of the novel coronavirus 2019-nCOV nucleic acid based on the Ct values of different probes, and providing a detection result.

8. The method of claim 7, wherein the primer and probe mix further contains polynucleotides having sequences shown in SEQ ID NOS: 10 to 12.

* * * * *

SEQUENCE LISTING

```
<160> NUMBER OF SEQ ID NOS: 17

<210> SEQ ID NO 1
<211> LENGTH: 22
<212> TYPE: DNA
<213> ORGANISM: Artificial sequence
<220> FEATURE:
<223> OTHER INFORMATION: Primer

<400> SEQUENCE: 1
aagaaattca actccaggca gc                                    22

<210> SEQ ID NO 2
<211> LENGTH: 22
<212> TYPE: DNA
<213> ORGANISM: Artificial sequence
<220> FEATURE:
<223> OTHER INFORMATION: Primer

<400> SEQUENCE: 2
gctggttcaa tctgtcaagc ag                                    22

<210> SEQ ID NO 3
<211> LENGTH: 19
<212> TYPE: DNA
<213> ORGANISM: Artificial sequence
<220> FEATURE:
<223> OTHER INFORMATION: Probe

<400> SEQUENCE: 3
tcaccgccat tgccagcca                                        19

<210> SEQ ID NO 4
<211> LENGTH: 18
<212> TYPE: DNA
```

```
<213> ORGANISM: Artificial sequence
<220> FEATURE:
<223> OTHER INFORMATION: Primer

<400> SEQUENCE: 4
ttatcacccg cgaagaag                                                     18

<210> SEQ ID NO 5
<211> LENGTH: 20
<212> TYPE: DNA
<213> ORGANISM: Artificial sequence
<220> FEATURE:
<223> OTHER INFORMATION: Primer

<400> SEQUENCE: 5
tctagtagca tgacacccct                                                   20

<210> SEQ ID NO 6
<211> LENGTH: 24
<212> TYPE: DNA
<213> ORGANISM: Artificial sequence
<220> FEATURE:
<223> OTHER INFORMATION: Probe

<400> SEQUENCE: 6
acgtgcatgg attggcttcg atgt                                              24

<210> SEQ ID NO 7
<211> LENGTH: 23
<212> TYPE: DNA
<213> ORGANISM: Artificial sequence
<220> FEATURE:
<223> OTHER INFORMATION: Primer

<400> SEQUENCE: 7
ctttcgtggt attcttgcta gtt                                               23

<210> SEQ ID NO 8
<211> LENGTH: 21
<212> TYPE: DNA
<213> ORGANISM: Artificial sequence
<220> FEATURE:
<223> OTHER INFORMATION: Primer

<400> SEQUENCE: 8
cacgttaaca atattgcagc a                                                 21

<210> SEQ ID NO 9
<211> LENGTH: 26
<212> TYPE: DNA
<213> ORGANISM: Artificial sequence
<220> FEATURE:
<223> OTHER INFORMATION: Probe

<400> SEQUENCE: 9
tagccatcct tactgcgctt cgattg                                            26

<210> SEQ ID NO 10
<211> LENGTH: 18
<212> TYPE: DNA
<213> ORGANISM: Artificial sequence
<220> FEATURE:
<223> OTHER INFORMATION: Primer

<400> SEQUENCE: 10
ctaacactgg ctcgtgtg                                                     18
```

<210> SEQ ID NO 11
<211> LENGTH: 17
<212> TYPE: DNA
<213> ORGANISM: Artificial sequence
<220> FEATURE:
<223> OTHER INFORMATION: Primer

<400> SEQUENCE: 11
tgggatgggg agtctgt                                                    17

<210> SEQ ID NO 12
<211> LENGTH: 21
<212> TYPE: DNA
<213> ORGANISM: Artificial sequence
<220> FEATURE:
<223> OTHER INFORMATION: Probe

<400> SEQUENCE: 12
aggctggtgt aaagcggcct t                                               21

<210> SEQ ID NO 13
<211> LENGTH: 102
<212> TYPE: DNA
<213> ORGANISM: Severe acute respiratory syndrome coronavirus 2

<400> SEQUENCE: 13
ctaacactgg ctcgtgtgac aaggccatga ggctggtgta aagcggcctt ggagtgtgta     60
ttaagtaggc gcacagtagg tctgaacaga ctccccatcc ca                       102

<210> SEQ ID NO 14
<211> LENGTH: 26
<212> TYPE: DNA
<213> ORGANISM: Artificial sequence
<220> FEATURE:
<223> OTHER INFORMATION: Primer

<400> SEQUENCE: 14
atcaagttaa tggttaccct aacatg                                          26

<210> SEQ ID NO 15
<211> LENGTH: 25
<212> TYPE: DNA
<213> ORGANISM: Artificial sequence
<220> FEATURE:
<223> OTHER INFORMATION: Primer

<400> SEQUENCE: 15
caacagcttc tctagtagca tgaca                                           25

<210> SEQ ID NO 16
<211> LENGTH: 26
<212> TYPE: DNA
<213> ORGANISM: Artificial sequence
<220> FEATURE:
<223> OTHER INFORMATION: Primer

<400> SEQUENCE: 16
tgggttttaa aatgaattat caagtt                                          26

<210> SEQ ID NO 17
<211> LENGTH: 24
<212> TYPE: DNA
<213> ORGANISM: Artificial sequence
<220> FEATURE:

```
<223> OTHER INFORMATION: Primer

<400> SEQUENCE: 17
aacctagctg taaaggtaaa ttgg                                          24
```